(12) United States Patent  
Grable et al.

(10) Patent No.: US 7,896,420 B2
(45) Date of Patent: Mar. 1, 2011

(54) DUAL LATCH SECOND ROW DUMP AND TUMBLE SEAT WITH OFFSETTING FREE PIVOT SEATBACK AND FLOOR LATCHES

(75) Inventors: David Grable, Clinton Township, MI (US); Tavis Lutzka, Davisburg, MI (US); Stephen Bruck, Howell, MI (US); Stanley D. Pacolt, Clarkston, MI (US)

(73) Assignee: BAE Industries, Inc., Warren, MI (US)

( * ) Notice: Subject to any disclaimer, the term of this patent is extended or adjusted under 35 U.S.C. 154(b) by 202 days.

(21) Appl. No.: 12/054,734

(22) Filed: Mar. 25, 2008

(65) Prior Publication Data

US 2009/0243324 A1 Oct. 1, 2009

Related U.S. Application Data

(63) Continuation-in-part of application No. 11/247,638, filed on Oct. 11, 2005, now Pat. No. 7,434,862.

(51) Int. Cl.
*B60N 2/02* (2006.01)
(52) U.S. Cl. .................. 296/65.05; 248/503.1
(58) Field of Classification Search .............. 296/65.03, 296/65.05, 65.09, 65.08; 297/331, 332, 333, 297/335, 336; 248/503.1
See application file for complete search history.

(56) References Cited

U.S. PATENT DOCUMENTS

| | | | |
|---|---|---|---|
| 4,634,182 A | 1/1987 | Tanaka | |
| 5,163,735 A | 11/1992 | Aljundi | |
| 5,476,307 A | 12/1995 | Whalen | |
| 5,597,206 A * | 1/1997 | Ainsworth et al. | ..... 297/378.12 |
| 5,603,550 A | 2/1997 | Holdampf et al. | |
| 5,683,140 A | 11/1997 | Roth et al. | |
| 6,019,413 A | 2/2000 | Scraver et al. | |
| 6,290,297 B1 | 9/2001 | Yu | |
| 6,375,246 B1 | 4/2002 | Nicola et al. | |
| 6,513,875 B1 | 2/2003 | Gray et al. | |
| 6,709,040 B1 | 3/2004 | Drew et al. | |
| 6,742,845 B2 | 6/2004 | Nock et al. | |
| 7,118,178 B2 | 10/2006 | Daniels et al. | |
| 7,140,682 B2 | 11/2006 | Jaeger et al. | |
| 7,152,922 B2 | 12/2006 | Garland | |
| 7,198,316 B2 | 4/2007 | Lutzka et al. | |
| 7,222,907 B2 | 5/2007 | Lutzka et al. | |
| 7,434,862 B2 * | 10/2008 | Lutzka et al. | ............ 296/65.03 |
| 7,500,707 B2 * | 3/2009 | Lutzka et al. | ............ 296/65.03 |
| 2004/0124684 A1 * | 7/2004 | Bonk | .................. 297/378.12 |
| 2006/0273645 A1 | 12/2006 | Ferrari et al. | |
| 2007/0052255 A1 | 3/2007 | O'Connor | |
| 2007/0080555 A1 * | 4/2007 | Lutzka et al. | ............ 296/65.03 |

* cited by examiner

*Primary Examiner*—Lori L Lyjak
(74) *Attorney, Agent, or Firm*—Gifford, Krass, Sprinkle, Anderson & Citkowski, P.C.

(57) ABSTRACT

An improved seat assembly in which the first and second pairs of seatback and floor mounted latches associated with first and second sides of prior dump and tumble assemblies are substituted by an improved design incorporating a single reinforced lock and release seatback latch and either a single or pair of floor latches arranged on opposite sides of the seat. Additional supports include a free pivoting and secondary seatback latch, as well as an optional floor supported riser assembly in lieu of the second floor latch and which are positioned at alternating inboard/outboard seatback and floor locations of the seat assembly. In cooperation with the redesigned fully functional latches, the free pivot seatback and optional floor riser latches provide a cost advantageous design exhibiting reduced part count.

23 Claims, 8 Drawing Sheets

DUAL LATCH SECOND ROW DUMP AND TUMBLE SEAT WITH OFFSETTING FREE PIVOT SEATBACK AND FLOOR LATCHES

CROSS-REFERENCE TO RELATED APPLICATIONS

This application is a continuation-in-part of U.S. patent application Ser. No. 11/247,638, filed Oct. 11, 2005 (now U.S. Pat. No. 7,434,862).

FIELD OF THE INVENTION

The present invention relates generally to a dump and tumble rear row seat. More specifically, the present invention describes an improved seat assembly in which the first and second pairs of seatback and floor mounted latches associated with first and second sides of prior dump and tumble assemblies are substituted by an improved design incorporating a single pair of reinforced lock and release seatback and floor latches arranged on opposite sides of the seat. A second pair of supports including a free pivoting and secondary seatback latch, as well as a floor supported riser assembly are positioned at alternating inboard/outboard seatback and floor locations of the seat assembly and, in cooperation with the redesigned single pair of fully functional latches, provide a cost advantageous design exhibiting reduced part count.

BACKGROUND OF THE INVENTION

The prior art is fairly well documented with examples of vehicle seat folding (dumping) and tumbling assemblies. As is known, a desirable feature of rear row mounted seat assemblies is the ability to sequentially dump a pivotal seatback against a floor supported seat bottom, following which the sandwiched back and bottom are released from one or more striker locations associated with the vehicle floor and permitted to forwardly rotate together to a tumble location, whereby the vehicle interior space formally occupied by the seat in the prior use position is now available for use as storage.

U.S. Pat. No. 6,910,739, issued to Grable et al., discloses a recliner mechanism for use with a vehicle seat having bottom and a pivotally secured back. A release mechanism is operably engaged to the back and includes an actuating handle extending from the bottom. A plate is secured to the back at a first location and pivotable along with the back about an axis defined at a second location, an arcuate exterior surface defined by the plate exhibiting a recessed detent. A floor release lever is secured to the bottom proximate the plate and is pivotally associated with the release mechanism by a cable extending to a floor latch mechanism associated with the vehicle. A male detent is pivotally secured to the seat bottom in inter-disposed fashion between the floor release lever and the plate. Upon the release mechanism rotating the floor release lever, and the cable causing the seat bottom to disengage from the floor latch mechanism, the male detent is influenced by the release lever in a first direction to seat against the recessed detent location of the plate and to prevent a forwardly pivoted seat back from being rotated in a reverse direction. Upon the seat bottom further being rotated back into engagement with the floor latch mechanism, the male detent is influenced by release lever in a second direction to permit the seat back to be pivoted in the reverse direction.

U.S. Pat. No. 7,222,907, issued to Lutzka et al., teaches a release latch for use with a vehicle seat. A latch plate is rotatably secured to the seat and engages a floor-mounted striker. A cam is rotatably secured to the seat and defines a shoulder biasingly seating against a support surface of the latch plate. A lever actuates the cam away from the support surface. A coil spring extends between the cam and a location of the latch plate offset from its pivot point. Forward pivoting of the seat occurs upon the shoulder separating from the support surface, the coil spring causing the latch plate to further rotate in a disengaging direction relative to the striker and upon the coil spring exceeding an over center position relative to the pivot point of rotation of the latch plate.

A further example of a seatback assembly incorporating aspects associated with both floor release and seatback latches is set forth in U.S. Pat. No. 7,198,316, issued to Lutzka et al., and which teaches a combined seat back release and floor release for use with a vehicle seat. The seat back includes a first mechanism for forwardly rotating a seat back relative to a seat bottom. The floor release is actuated by the seat back by virtue of a linearly translatable cable extending therebetween. The cable acts upon a floor release lever, which is rotatably slaved to a pair of cam elements. A latch plate is rotatably secured to the seat and engages a floor-mounted striker. Shoulder portions associated with the cams define primary and secondary abutment surfaces acting against the support surface of the latch plate. The lever actuates the cams away from the support surface in response to the actuation of the cable from the seatback mechanism. Forward pivoting of the seat occurs upon the cam shoulders separating from the latch plate support surface, a coil spring causing the latch plate to further rotate in a disengaging direction relative to the striker and upon the coil spring exceeding an over center portion relative to the pivot point of rotation of the latch plate.

SUMMARY OF THE INVENTION

The present invention teaches a dump and tumble vehicle seat, such as which is incorporated into a second row location of multi-row passenger vehicle, and which provides a cost savings over conventional seat assemblies through the modification of a selective pair of first seatback and second offset floor support latch subassemblies. In cooperation with a second pair of free pivoting seatback and floor supported risers, the novel redesigned seat provides a significant cost savings, through a reduction of individually engageable latch subassemblies, from four to two, along with a reduction in cabling requirements and while maintaining full fold/dump and tumble functionality.

A seat bottom is pivotally mounted along a forward edge to a vehicle floor, with the seat back pivotally securing to the seat bottom along outboard and inboard extending sides. The first seatback latch subassembly is mounted between the seat back and seat bottom along the outboard side, a primary linkage controlling release of the seat back.

A second free pivoting seatback subassembly is mounted between the seat back and seat bottom along the inboard side, with a secondary linkage cooperatively operating with the first linkage, and such as through the use of a first cable secured to a first location of the primary linkage and extending to the second handle.

A floor latch subassembly is mounted to the seat bottom along the inboard side and includes at least one cam controlling a pivotally associated latch plate for operatively engaging a first floor supported striker. A floor supported riser is mounted to seat bottom along the outboard side and exhibits an underside configuration adapted to abut a second floor supported striker concurrent with the first latch subassembly engaging the first striker. A second cable is secured to a second location of the primary linkage and extends to the floor latch cam.

In a further preferred variant, the floor-supported riser is substituted by a second fully functional floor latch assembly, this providing additional floor reinforcing support in a selected operating variant. A third cable extends from a further location of the primary linkage associated with the first seatback latch subassembly (proximate in location to the second cable) and contacts a floor latch cam associated with the second floor latch.

In this fashion, a selected one of the cables is manipulated in a first action to release the seat back for rotating to a dump position against the seat bottom. One or more additional cables are further manipulated in a second action to facilitate release of the single or dual pair of floor latch subassemblies from their associated strikers, and to permit the seat back and seat bottom to pivot about the vehicle floor.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
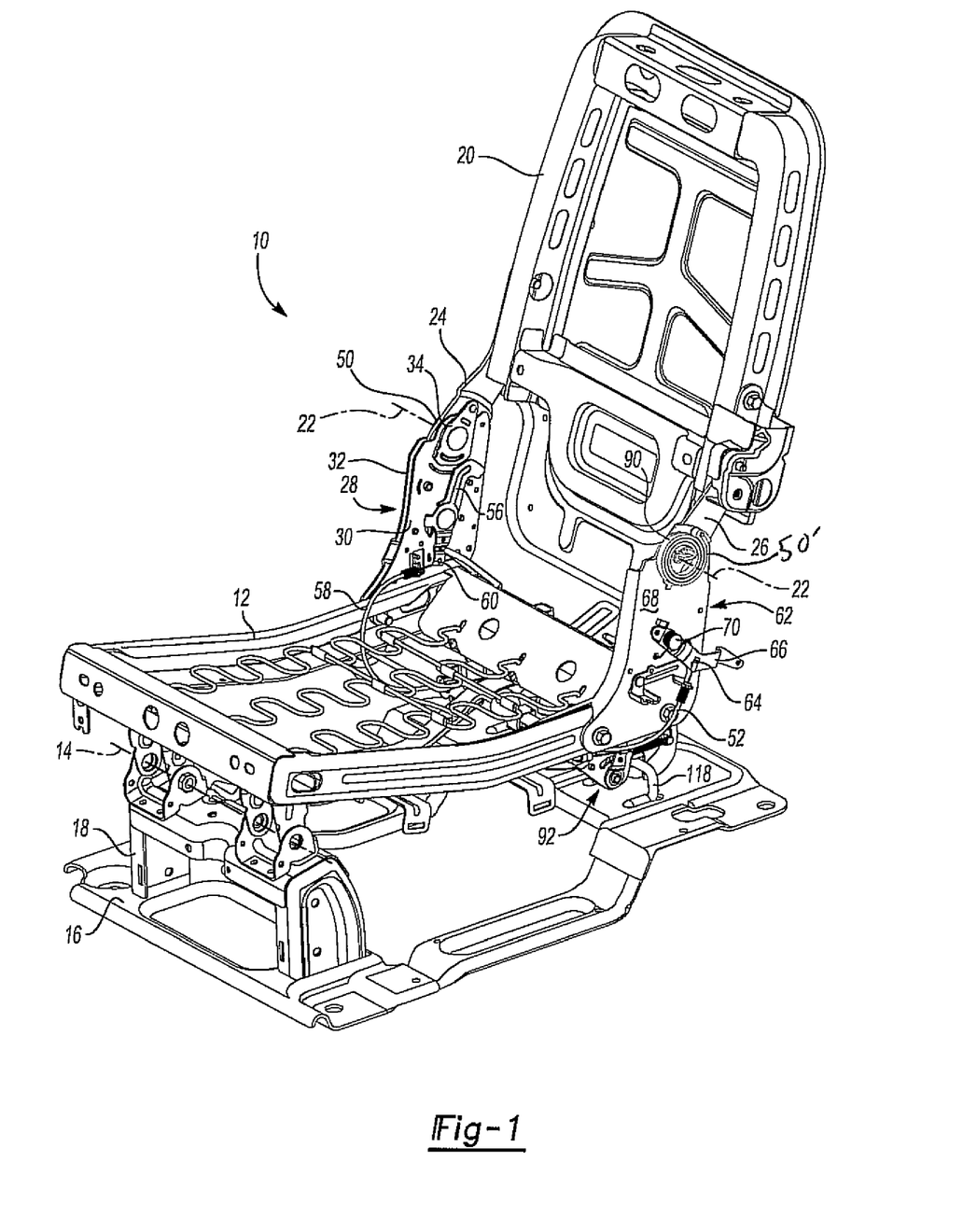
FIG. 1 is a perspective view of a seat assembly according to the present invention and which illustrates an outboard side located seatback latch in combination with an inboard located floor latch, a second inboard free pivoting seatback latch and a second outboard (dummy) floor riser assembly.

Referring now to FIG. 1, a perspective view is shown at 10 of a seat assembly according to the present invention. As previously described, the present invention teaches an improved seat assembly, and in which prior art first and second pairs of seatback and floor mounted latches associated with first and second sides of prior dump and tumble assemblies are substituted by an improved design incorporating a single pair of reinforced lock and release seatback and floor latches arranged on opposite sides of the seat. These in combination with the alternately offset pair of free pivoting seatback subassembly and floor supported riser with bottom configured striker abutment support, provide a fully functional and durable dump and tumble seat assembly exhibiting all of the required aspects of sequential seatback dump and forward tumble of a seat, such as which can be incorporated into a second row of a multi-row passenger vehicle interior.

Additionally, the ability to incorporate a second pair of supports, including a free pivoting and secondary seatback latch, as well as a floor supported riser assembly, are positioned at the alternating inboard/outboard seatback and floor locations of the seat assembly and, in cooperation with the redesigned single pair of filly functional latches and novel configuration of cabling, provide a cost advantageous design exhibiting reduced part count. It is also understood that, in reference to the present seat assembly being a rear row seat, this is intended to encompass incorporating into any non-front row seat, such as a second, third or rearmost seat associated with a multiple row vehicle, such as an SUV or minivan.

Referring again to FIG. 1, the seat as collectively defined herein and, most pertinently, includes a frame exhibiting a seat bottom 12 pivotally mounted along a forward edge, see axis 14, to a vehicle floor, see as further generally shown at 16. As shown, the forward rotating axis 14 is defined atop a pillar support 18 associated with the vehicle, this in order to provide appropriate clearance for the seat bottom 12 and associated seat back 20, upon the latter first being folded (dumped) against the bottom. At this point, the collectively sandwiched seat back 20 and bottom 12 are capable of being subsequently rotated to a forward-most tumble position, this permitting such as both ingress/egress by individuals seated on a succeeding third row of vehicle seats, or the opening of additional open space once occupied by the seat in the design/use position of FIG. 1. It is further understood that, while the seat assembly illustrated in FIG. 1 includes a number of structural elements and features (such as cushions), for purposes of ease of explanation and relevance, the present description will be limited to those components most relevant to the present inventions.

The seatback 20 is pivotally secured, see axis 22, to the seat bottom 12 along each of outboard and inboard extending sides, these in part defined by lowermost extending arm support locations 24 and 26 associated with the seatback. A first seatback latch subassembly is generally referenced at 28 and is mounted between the seat back 20 and seat bottom 12 along the outboard side.

Figure 8:
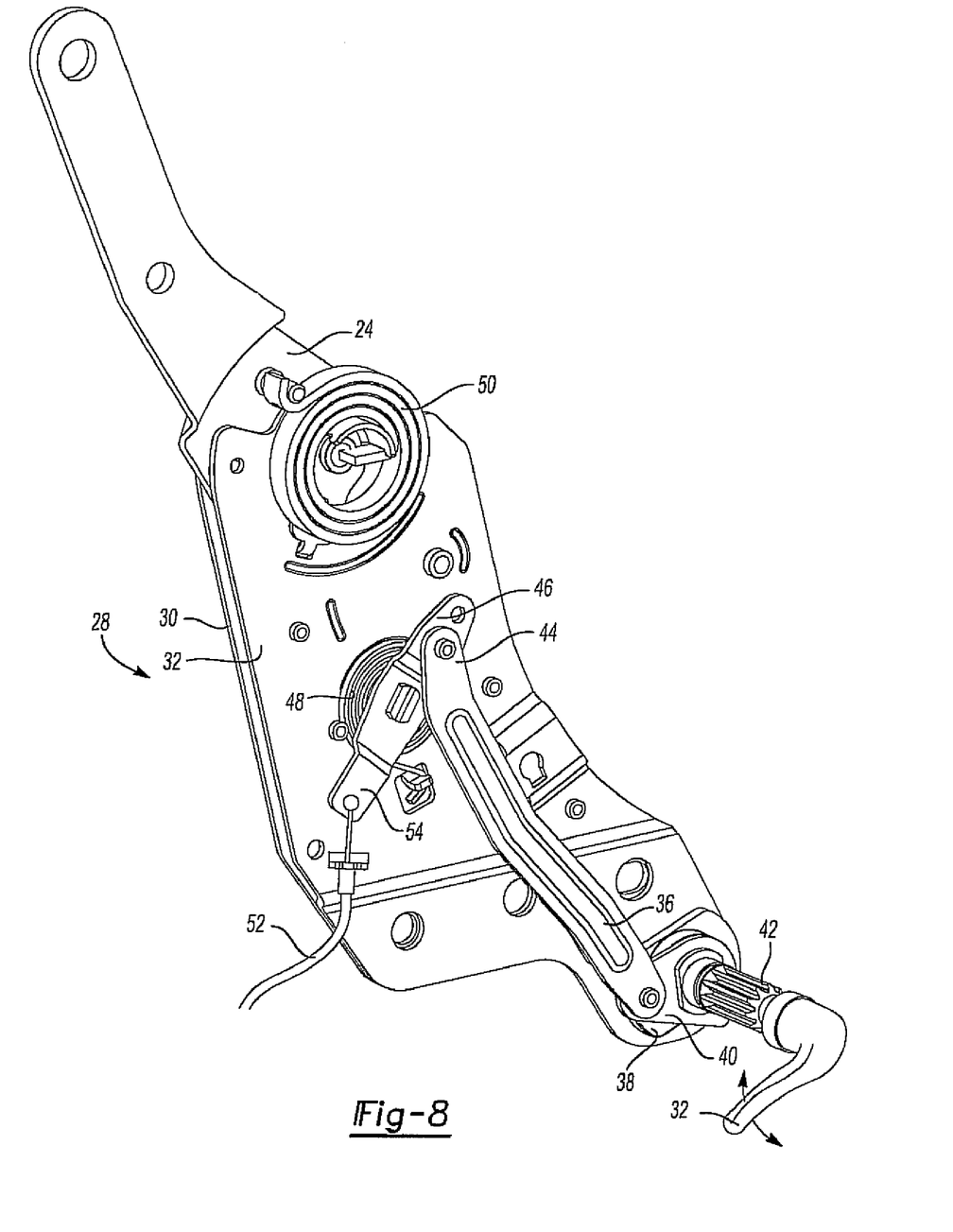
FIG. 8 is an illustration similar to that shown in FIG. 7 and showing the architecture and cabling arrangement associated with the selectively engagegable seatback latch subassembly.

As additionally illustrated in rotated sectional perspective in FIG. 8, this further showing the architecture and cabling arrangement associated with the selectively engagegable seatback latch subassembly, the first seatback latch subassembly 28 incorporates first 30 and second 32 spaced apart support plates, between which an arcuate defined arm defining the lowermost extending support 24 is rotatably slaved. A lock plate 34 (see only FIG. 1) is secured to an exterior surface of the selected support plate 30 and is rotatably slaved to the seatback arm 24.

A first handle (or lever) is illustrated in phantom at 32 in FIG. 8 and engages a primary linkage for controlling release of the seat back 20 and which includes an elongate (e.g. typically bracket shaped) member 36 as again shown in FIG. 8, which is pivotally mounted at a first lowermost end 38 to a rotatably slaved plate 40 associated with such as a splined shaft 42 upon which the handle 32 is secured, and in order to displace upon rotation of the handle. A second uppermost end 44 of the elongate member 36 pivotally secures to a first lever 46, this in turn rotatably mounted in biased fashion, see (secondary) clock spring 48, to selected exterior surface of support plate 32 associated with the seatback latch subassembly 28. In contrast, a main clock spring 50 biases the seat back (see arm 24) in a forward rotating fashion with respect to the seatback latch assembly 28, the secondary clock spring 48 biasing the first lever 46 in an opposite rotational direction relative to the main clock spring 50.

As will be described in further detail, a first linearly translatable cable 52 (see again FIG. 8) secures to an opposite extending end location of the first lever 46, relative to the connection location 44 of the elongated member 36 and according to a protocol which will be subsequently described. A second lever 56 (see FIG. 1) is associated with the first seatback latch subassembly 28, securing in likewise biased and rotatable fashion to an opposite surface of the seatback latch, e.g. to exterior face of support plate 30 and as opposed to the first lever 54 (FIG. 8) securing to exterior face support plate 32.

The second lever 56 in turn releasably engages the seatback, via contacting a catch location associated with the lock plate 34. A second and likewise linearly translatable cable 58 (again FIG. 1) extends from a first location 60 associated with an opposite extending edge of the second lever 58.

A second free pivoting seatback subassembly is shown at 62 (see also FIGS. 1A, 6, and 7) and is mounted between the seat back 20 and seat bottom 12 along the inboard side 26, the assembly 62 having a secondary linkage cooperatively operating with the first linkage (e.g. again primarily including pivotal elongate member 36, first lever 46 and second lever 56) and such as through the first cable 52, a second opposite end of which secures, at 64, to a second handle 66 in turn pivotally associated with the subassembly 62. A single support plate 68 is shown and can be associated with the second free pivoting seatback assembly 62, owing in part to the reduced part content requirement associated with that subassembly, and further such that the (second) handle 66 is secured in biased fashion about a pivot connection 70 (see enlarged plan view of FIG. 6) and biased by a spring 72 in such as a clockwise direction, see further arrow 74.

The associated seatback support 26 is likewise secured to the single plate 68 at the pivotal connection 22 previously identified. As with the first seatback latch subassembly 28, a clock spring 50' is secured to an exterior (inboard) facing side of the plate 68, similar to the clock spring 50 secured to an exterior (outboard) facing surface of the spaced apart plate 32 associated with the first latch subassembly 28. It is also understood that a pair of support plates can be provided (such as shown at 68 and 69 in FIG. 7) for the secondary free pivoting seatback subassembly.

Figure 7:
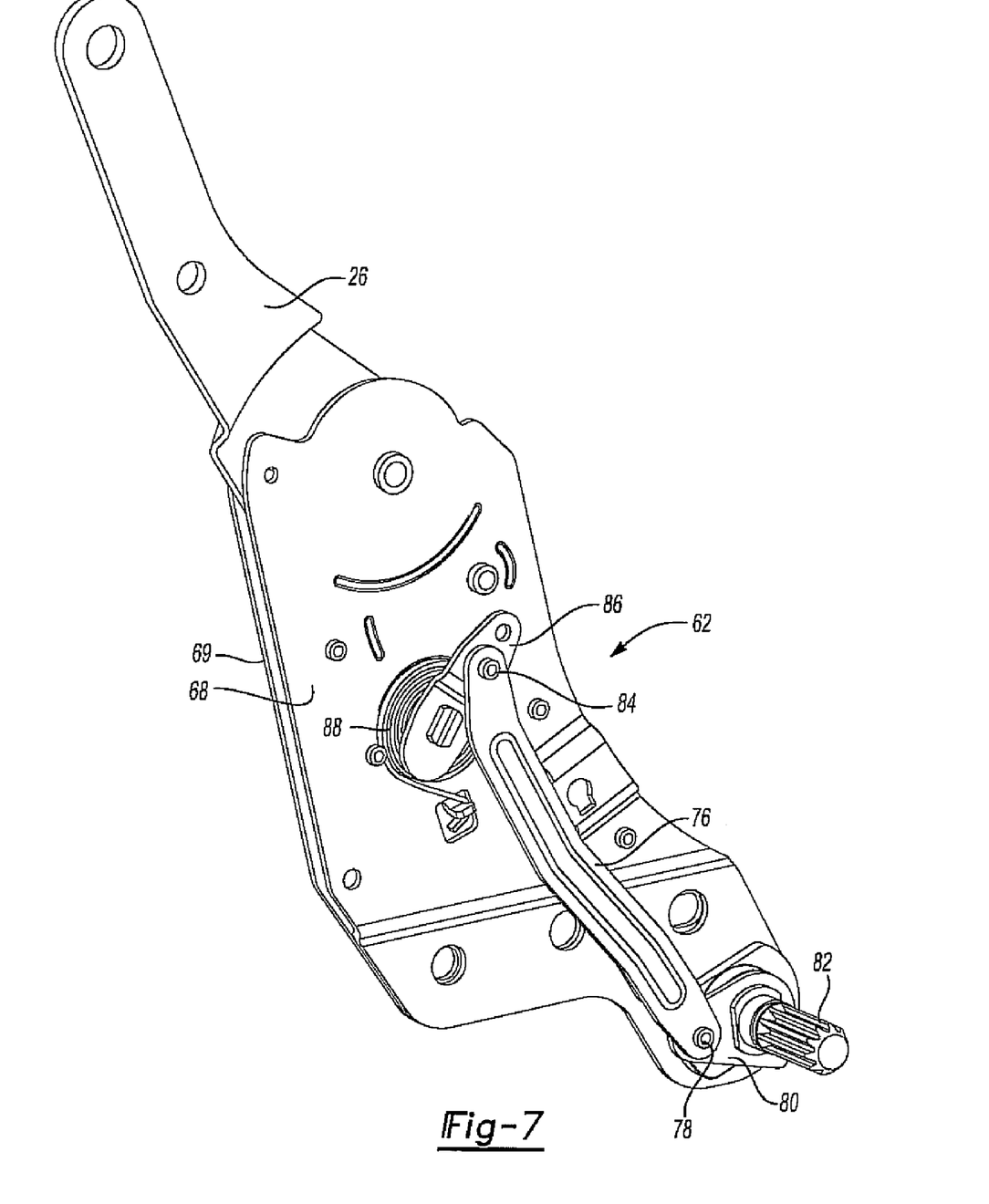
FIG. 7 is a rotated perspective view of the free pivot seatback latch of FIG. 6.

As illustrated in the rotated sectional perspective of FIG. 7, the second free pivoting seatback assembly 62 incorporates a similar (secondary) linkage arrangement as compared to the primary linkage of the first seatback latch subassembly 28. This includes another elongate (e.g. typically bracket shaped) member 76, which is pivotally mounted at a first lowermost end 78 to a rotatably slaved plate 80 associated with such as a splined shaft 82, upon which a further handle (not shown) may be secured.

A second uppermost end 84 of the elongate member 76 pivotally secures to a first lever 86, this in turn rotatably mounted in biased fashion, see (secondary) clock spring 88, to selected exterior surface of support plate 68 associated with the free pivot seatback subassembly 62. In contrast, a main clock spring 90 biases the seat back (see arm 26) in a forward rotating fashion with respect to the subassembly 62, the secondary clock spring 88 biasing the first lever 86 in an opposite rotational direction relative to the main clock spring 90. In contrast to FIG. 1, again illustrating the inboard facing surface (support plate 30) and associated second lever 56 of the first linkage assembly, the free pivoting seatback subassembly 62 does not require or include any additional components, given that the forward actuation about the inboard side occurs automatically and in slaved fashion upon release of the second lever 56 from the lock plate 34 in the first seatback latch subassembly 28.

Figure 6:
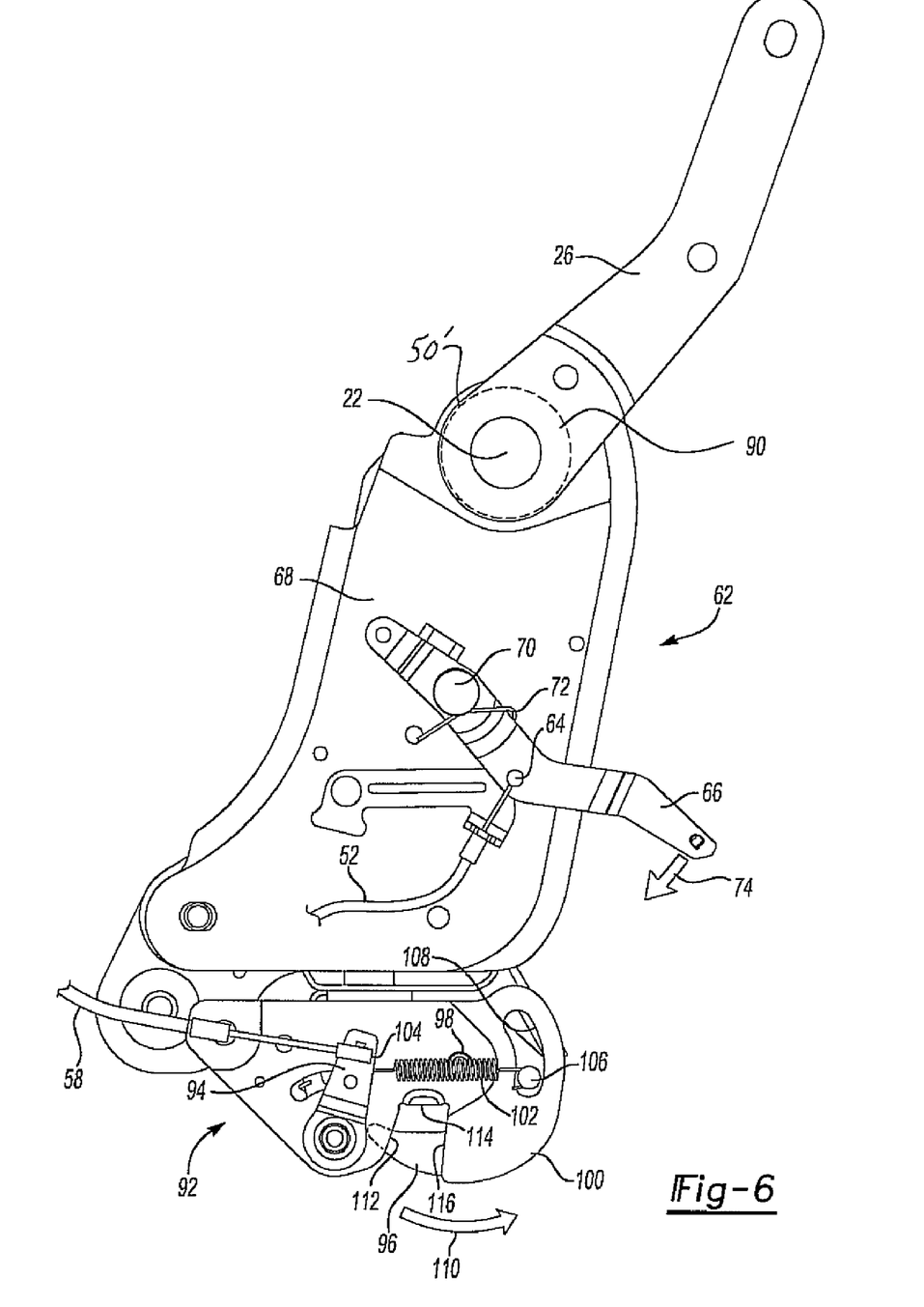
FIG. 6 is a side view of the seatback assembly of FIG. 1 and more clearly illustrating the features of the free pivot seatback latch and functional floor latch.

A floor latch subassembly, see as generally referenced at 92 as best shown in FIG. 6, is mounted to the seat bottom along the inboard side and includes at least one cam 94 controlling a pivotally associated latch plate 96 (largely hidden from view but including a rotatable component secured about a pivot location 98 to a fixed support plate 100. A second end 104 of the linearly displaceable second cable 58 secures to a location of the cam 94. A coil spring 102 connects at a first end to a location of the rotatable cam 94 and, at a second end, to a pin 106 seated within an interior channel 108 arcuately defined within the support plate 100, the pin 106 mounted to a rear location of the latch plate 96.

Reference is also made to the floor latch subassemblies of U.S. Pat. Nos. 7,222,907 and 7,198,316, each disclosing a functionally similar design of a floor latch subassembly proper and its manner of pivotally rotating the latch plate 96 upon forward translation of the associated cable end (as shown at 94 in FIG. 6) resulting in pivoting of the cam 94, and resultant rotation of the latch plate 96 in a direction referenced by arrow 110 in FIG. 6. As also shown, an underside configuration of the support plate 100 is designed, see interiorly recessed surfaces 112, 114, and 116 which, collectively with the latch plate 96, engage a first floor supported striker 118 (FIG. 1).

Figure 1A:
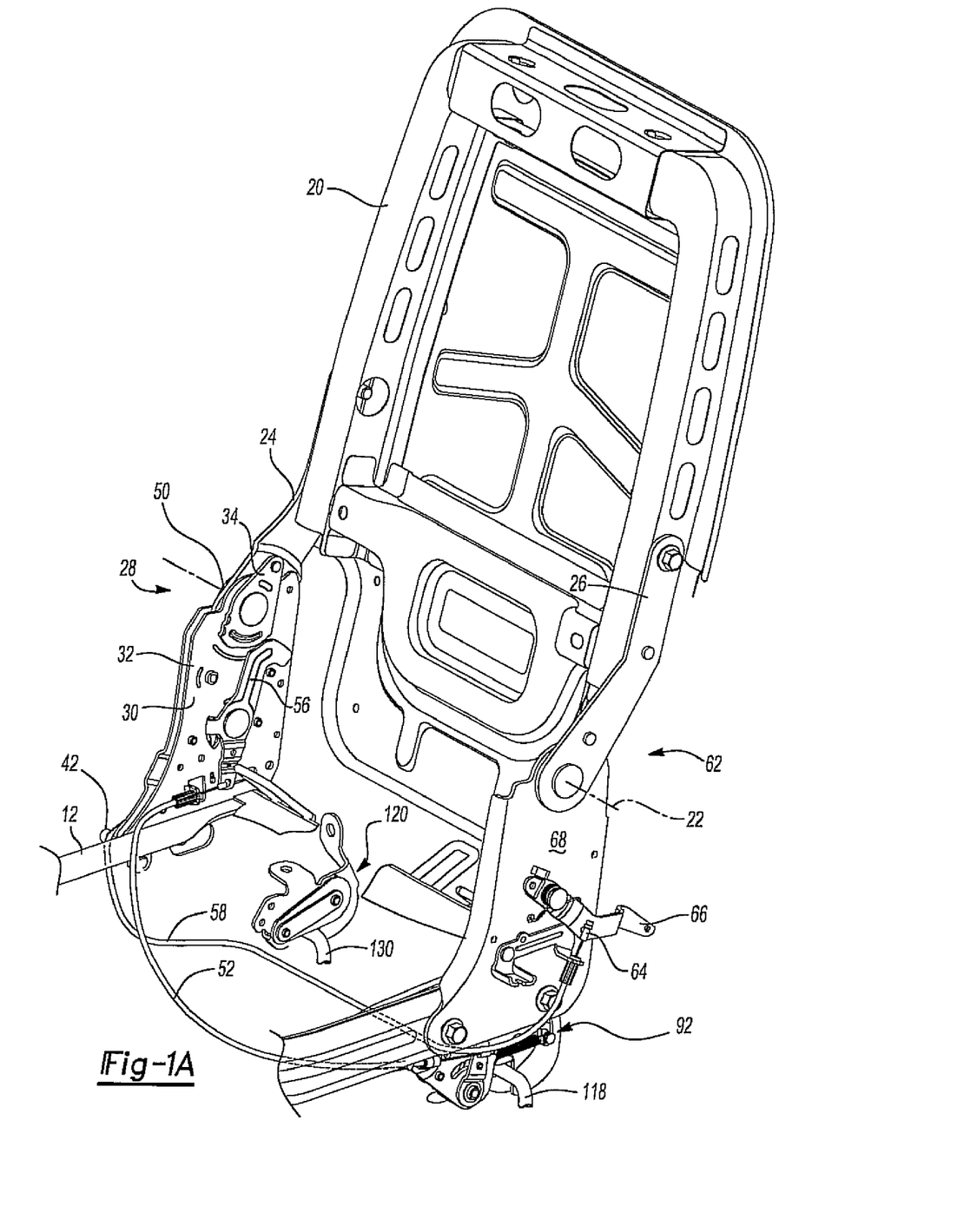
FIG. 1A is an enlarged perspective illustration with specified seat bottom components removed and better illustrating the location of the outboard directed floor bumper as well as the cables for operably interengaging the pairs of latches.
Figure 2:
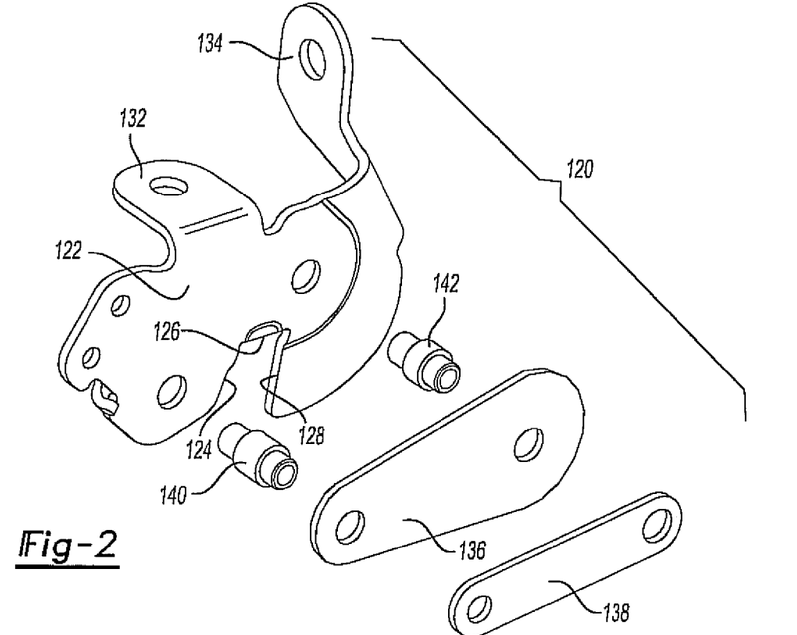
FIG. 2 is an exploded view of a floor supporting riser assembly according to the present invention.
Figure 3:
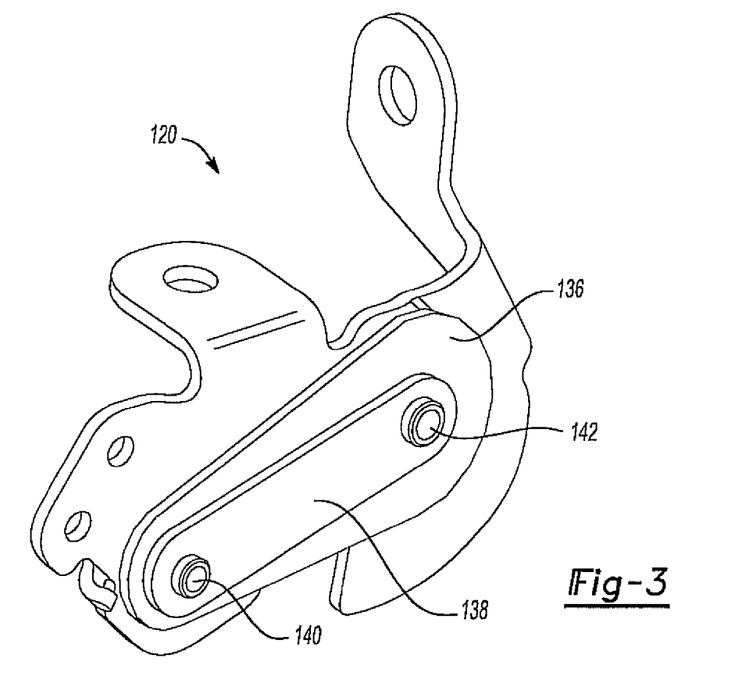
FIG. 3 is an assembled view of the floor supporting riser of FIG. 2.

FIG. 2 is an exploded view of a floor supporting riser assembly 120 according to the present invention, reference also being made to the environmental view of FIG. 1A and the assembled view of FIG. 3. The floor supported riser 120 is mounted to the seat bottom 12 approximate in lateral position to the outboard side (see again FIG. 1A) and includes primarily a support plate 122 which exhibits an underside configuration, see interior recessed surfaces 124, 126 and 128 adapted to abut a second floor supported striker (at 130 in FIG. 1A) concurrent with the first floor latch subassembly 92 engaging the first striker 118. As with the support plate 100 associated with the operative floor latch 92, the support plate 122 includes angled bracket end locations, see at 132 and 134, for securing the same to the underside location of the seat bottom.

The floor supported riser 120 further includes a reinforcing support, referenced in FIGS. 2 and 3 by first 136 and second 138 overlapping support plates, these secured by a pair of rivets 140 and 142 to the support plate 122 and partially overlapping the underside striker seating configuration (again recessed surfaces 124, 126 and 128). In this manner, the riser 120 establishes an abutting and non-latch disengaging configuration with the secondary striker 130, and which allows the seat bottom 12 to forwardly rotate about the pivot location 14 upon disengagement of the floor latch subassembly 92 as subsequently described.

Figure 4:
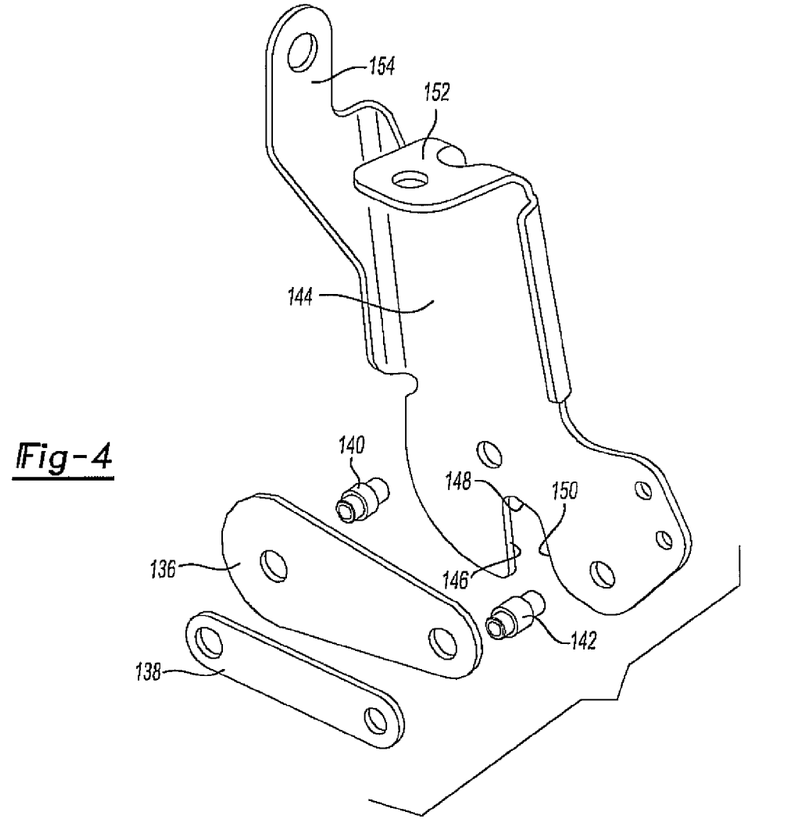
FIG. 4 is an exploded view of a floor supporting riser assembly according to a modified configuration to that previously shown in FIG. 2.

FIG. 4 is an exploded view of a floor supporting riser assembly according to a modified configuration to that previously shown in FIG. 2 and including an elongated support plate 144, again including an underside configuration (see interconnected and recessed underside surfaces 146, 148 and 150) with angled bracket end locations 152 and 154. Reinforcing support plates 136 and 138 and attachment rivets 140 and 142 can be again provided and it is understood that the manner of constructing or reinforcing the striker abutting location can be modified from that shown.

In this fashion, a selected one of the first 52 or second 58 cables is manipulated in a first action to release the seat back 20 for rotating to a dump position against the seat bottom 12. Either selected cable is further manipulated in a second action to facilitate release of the floor latch subassembly 92 from its associated striker 118 and to permit the folded seat back 20 and seat bottom 12 to pivot about the vehicle floor 16. As previously described, the second handle 66 is associated with the free pivoting seatback assembly 62 and controls the secondary linkage as collectively viewed in FIGS. 6 and 7, concurrent with the first handle 32 controlling the primary linkage as further collectively viewed in FIGS. 1 and 8.

Figure 5:
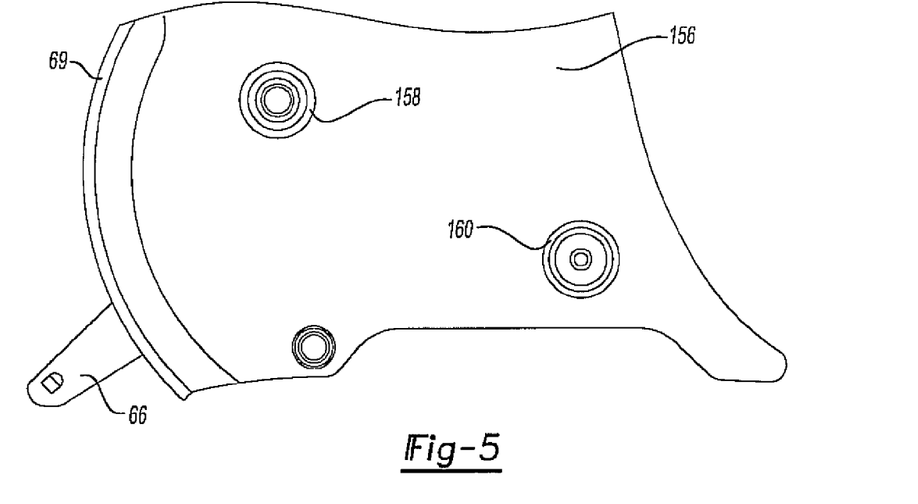
FIG. 5 is an enlarged sectional illustration of the free pivoting seatback latch, and in particular showing the features of the forwardly repositioned plastic cover stand-offs.

Other features include a cover shield, see at 156 in FIG. 5, applied over a selected and exterior facing surface of a support plate (e.g. at 69 when viewing FIG. 7) associated with the second free pivoting seatback subassembly 62. A pair of stand-offs, 158 and 160, secure the shield 156 to the support plate 69.

Figure 9:
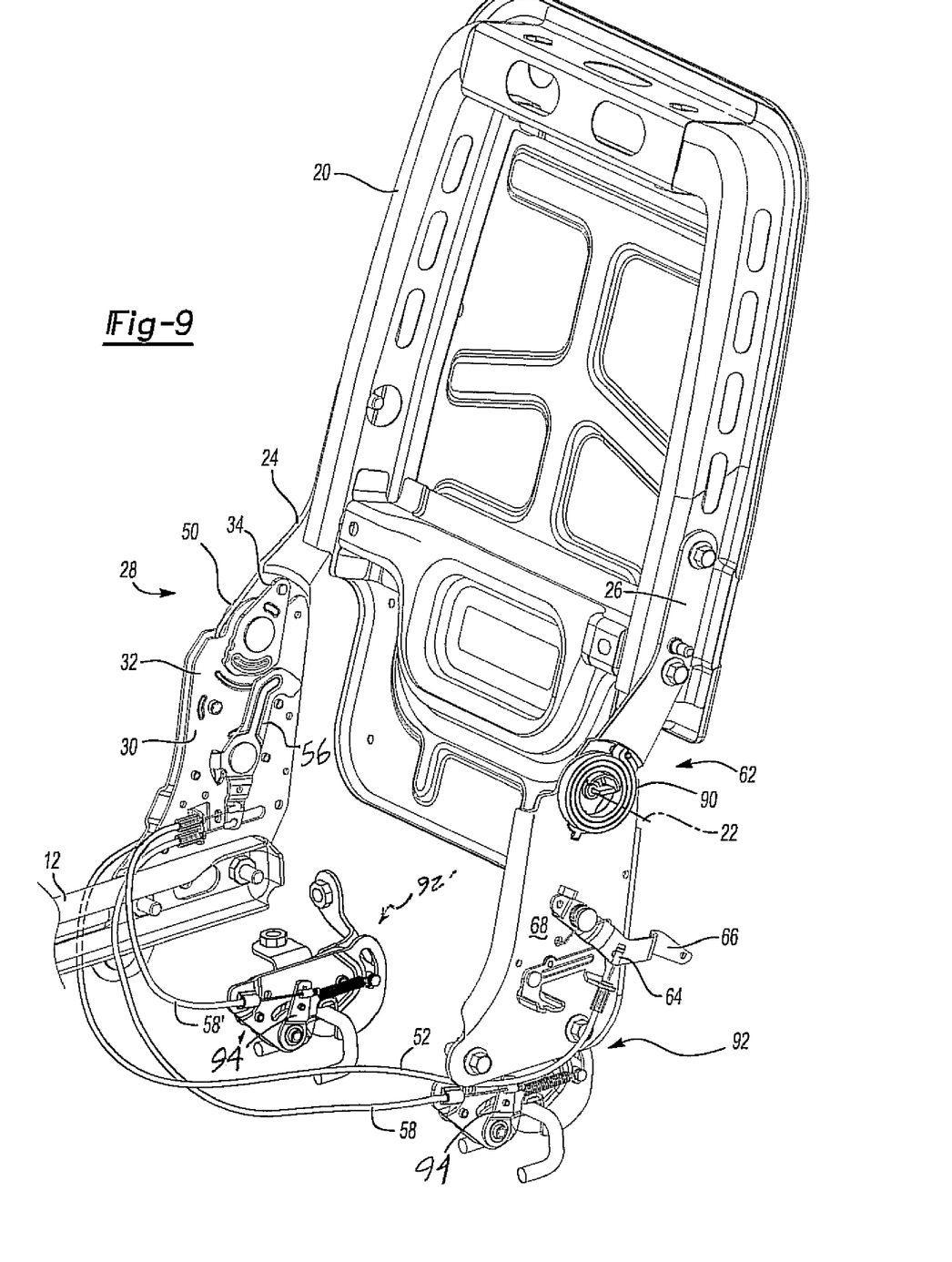
FIG. 9 is an illustration similar to that shown in FIG. 1A of a further preferred variant, with the floor supported riser being substituted by a second fully functional floor latch assembly.

Referring finally to FIG. 9, an illustration similar to that shown in FIG. 1A of a further preferred variant, with the floor supported riser (again at 120 in FIG. 1A) being substituted by a second fully functional floor latch assembly, see as generally shown at 92'. This alternate configuration provides additional floor reinforcing support in a selected operating variant, and which provides an extra degree of robust floor supporting reinforcement to the performance characteristics established by the single operating floor latch in the initial embodiment.

A third cable, at 58', is similar to that previously described at 58 and extends from a further location of the primary linkage, see again second lever 56, associated with the first seatback latch subassembly (proximate in location to the second cable 58). The third cable 58' is somewhat shorter in overall length as compared to the cable 58 and is secured to a support location associated with the second floor latch subassembly 92'. An inner-translating coil portion contacts a floor latch cam, see at 94' associated with the second floor latch. The floor latch subassembly 92' is otherwise identically constructed to that shown at 92, as are the remaining features also shown in the initial variant of FIG. 1A.

In this fashion, a selected one of the cables is manipulated in a first action to release the seat back for rotating to a dump position against the seat bottom. One or more additional cables are further manipulated in a second action to facilitate release of the single or dual pair of floor latch subassemblies from their associated strikers, and to permit the seat back and seat bottom to pivot about the vehicle floor.

The present invention therefore discloses a novel, improved and cost efficient dual latch seat design, and by which the unique and novel reconfiguration of a pair of respectively outboard/inboard positioned seatback and floor latch subassemblies are employed along with a secondary free pivoting seatback and alternately positioned floor riser (bumper support) floor latch for providing complete operational functionality and durability with a reduced part content. Additional novelty is associated with the reduced cabling requirements of the present design, along with the configuration of the primary and secondary linkage assemblies associated with the first seatback and secondary free pivoting seatback assemblies.

Having described our invention, additional preferred embodiments will become evident to those skilled in the art to which it pertains, and without deviating from the scope of the appended claims:

We claim:
1. A convertible vehicle seat, comprising:
   a seat bottom adapted to being secured in pivoting fashion along a forward edge thereof to a vehicle floor, a seat back pivotally securing to the seat bottom along both of outboard and inboard extending sides;
   a first seatback latch subassembly mounted between the seat back and seat bottom along a first one of the selected sides, a first handle operatively engaging a primary linkage for controlling release of the seat back;
   a second free pivoting seatback subassembly mounted between the seat back and seat bottom along the other of the extending sides, a second handle associated with said free pivoting seatback subassembly and controlling a secondary linkage;
   a cover shield applied over a selected and exterior facing surface of a support plate associated with said second free pivoting seatback subassembly, a pair of stand-offs securing said shield to said support plate;
   a first cable secured to a first location of said primary linkage and extending to said second handle;
   a floor latch subassembly mounted to a rearward location of the seat bottom and including at least one cam controlling a pivotally associated latch plate for operatively engaging a first floor supported striker;
   a floor supported riser mounted to a further rearward location of the seat bottom and exhibiting an underside configuration adapted to abut a second floor supported striker concurrent with said first latch subassembly engaging the first striker; and
   a second cable secured to a second location of said primary linkage and extending to said floor latch cam;
   either of said first and second handles being manipulated to release the seat back for rotating to a dump position against the seat bottom; either of said handles being further manipulated to facilitate release of said floor latch subassembly from said associated striker and to permit the seat back and seat bottom to pivot about the vehicle floor.

2. The seat as described in claim 1, each of said primary and secondary linkages further comprising:
   an elongate member pivotally mounted at a first lowermost end of said selected first and second seatback subassemblies and being slaved to displace upon rotation of said associated handle; and
   a second uppermost end of said elongate member pivotally securing to a first lever, in turn rotatably mounted in biased fashion to a selected surface of said selected seatback subassembly.

3. The seat as described in claim 2, further comprising a second lever associated with said first seatback latch subassembly securing in likewise biased and rotatable fashion to an opposite surface of said seatback latch, said second lever in turn releasably engaging the seatback, said second cable extending from a further location associated with said second lever.

4. The seat as described in claim 3, further comprising said first cable extending from a further location associated with a first lever secured to said first seatback latch subassembly.

5. The seat as described in claim 3, further comprising a lock plate secured to a surface of a selected support plate associated with said first seatback latch subassembly and rotatably slaved to an extending arm portion associated with the seatback.

6. The seat as described in claim 1, each of said floor latch subassembly and said floor supported riser further comprising a support plate secured to a lowermost location of the seat bottom proximate an associated floor supported striker, the underside configuration being defined in said support plate for seating the striker.

7. The seat as described in claim 6, said floor supported riser further comprising at least one reinforcing support secured by a pair of rivets to said support plate and partially overlapping the underside striker seating configuration.

8. The seat as described in claim 7, said reinforcing support further comprising first and second support plates.

9. The seat as described in claim 2, further comprising a main clock spring biasing the seat back in a forward rotating fashion with respect to each of said first and second seatback assemblies, a second clock spring biasing said first lever associated with each of said first and second seatback assemblies in an opposite rotational direction relative to said main clock spring.

10. The seat as described in claim 6, said floor latch subassembly further comprising a coil spring engaging said cam at a first end, an opposite extending end of said spring securing to a pin, in turn inserting through an arcuate slot defined in said support plate.

11. The seat as described in claim 1, further comprising said first seatback latch subassembly and said floor latch subassembly located at respective outboard and inboard locations associated with a vehicle seat, said second free pivoting seatback assembly and said floor supported riser located at further respective inboard and outboard locations.

12. A dump and tumble vehicle seat, comprising:
a seat bottom pivotally mounted along a forward edge to a vehicle floor, a seat back pivotally securing to the seat bottom along outboard and inboard extending sides;
a first seatback latch subassembly mounted between the seat back and seat bottom along the outboard side, a primary linkage controlling release of the seat back;
a second free pivoting seatback subassembly mounted between the seat back and seat bottom along the inboard side, a secondary linkage cooperatively operating with said first linkage;
a first cable secured to a first location of said primary linkage;
first and second floor latch subassemblies mounted to the seat bottom along both inboard and outboard sides, each of said floor latches including at least one cam controlling a pivotally associated latch plate for operatively engaging first and second proximate located floor supported strikers; and
second and third cables secured to associated locations of said primary linkage and extending to said floor latch cams associated with said first and second floor latch subassemblies;
at least one selected cable being manipulated in a first action to release the seat back for rotating to a dump position against the seat bottom and in a second action to facilitate release of said floor latch subassemblies from said associated striker and to permit the seat back and seat bottom to pivot about the vehicle floor.

13. The seat as described in claim 12, further comprising a first handle operatively engaging said primary linkage for controlling release of the seatback, a second handle being associated with said free pivoting seatback assembly and controlling said secondary linkage.

14. The seat as described in claim 12, each of said primary and secondary linkages further comprising:
an elongate member pivotally mounted at a first lowermost end of said selected first and second seatback subassemblies and being slaved to displace upon rotation of said associated handle; and
a second uppermost end of said elongate member pivotally securing to a first lever, in turn rotatably mounted in biased fashion to a selected surface of said selected seatback subassembly.

15. The seat as described in claim 14, further comprising a second lever associated with said first seatback latch subassembly securing in likewise biased and rotatable fashion to an opposite surface of said seatback latch, said second lever in turn releasably engaging the seatback, said second and third cables extending from further locations associated with said second lever.

16. The seat as described in claim 15, further comprising said first cable extending from a further location associated with a first lever secured to said first seatback latch subassembly.

17. The seat as described in claim 15, further comprising a lock plate secured to a surface of a selected support plate associated with said first seatback latch subassembly and rotatably slaved to an extending arm portion associated with the seatback.

18. The seat as described in claim 12, each of said floor latch subassemblies further comprising a support plate secured to a lowermost location of the seat bottom proximate an associated floor supported striker, the underside configuration being defined in said support plate for seating the striker.

19. The seat as described in claim 12, further comprising a cover shield applied over a selected and exterior facing surface of a support plate associated with said second free pivoting seatback subassembly, a pair of stand-offs securing said shield to said support plate.

20. The seat as described in claim 14, further comprising at least one main clock spring biasing the seat back in a forward rotating fashion with respect to each of said first and second seatback assemblies, a second clock spring biasing said first lever associated with each of said first and second seatback assemblies in an opposite rotational direction relative to said main clock spring.

21. The seat as described in claim 18, said floor latch subassemblies each further comprising a coil spring engaging said cam at a first end, an opposite extending end of said spring securing to a pin, in turn inserting through an arcuate slot defined in said support plate.

22. A dump and tumble vehicle seat mounted to a second row location of a vehicle interior, said seat comprising:
a seat bottom pivotally mounted along a forward edge to a vehicle floor, a seat back pivotally securing to the seat bottom along outboard and inboard extending sides;
a first seatback latch subassembly mounted between the seat back and seat bottom along the outboard side and including a handle operatively engaging a primary linkage controlling release of the seat back;
a second free pivoting seatback subassembly mounted between the seat back and seat bottom along the inboard side and including a second handle operating a secondary linkage cooperatively engaged with said first linkage;
a first cable secured to a first location of said primary linkage and extending to said second handle;
first and second floor latch subassemblies mounted to the seat bottom along both inboard and outboard sides, each of said floor latches including at least one cam controlling a pivotally associated latch plate for operatively engaging first and second proximate located floor supported strikers; and second and third cables secured to associated locations of said primary linkage and extending to said floor latch cams associated with said first and second floor latch subassemblies;

selected cables being manipulated in a first action to release the seat back for rotating to a dump position against the seat bottom and in a second action to facilitate release of said floor latch subassembly from said associated striker and to permit the seat back and seat bottom to pivot about the vehicle floor.

23. A convertible vehicle seat, comprising:

a seat bottom adapted to being secured in pivoting fashion along a forward edge thereof to a vehicle floor, a seat back pivotally securing to the seat bottom along both of outboard and inboard extending sides;

a first seatback latch subassembly mounted between the seat back and seat bottom along a first one of the selected sides, a first handle operatively engaging a primary linkage for controlling release of the seat back;

a second free pivoting seatback subassembly mounted between the seat back and seat bottom along the other of the extending sides, a second handle associated with said free pivoting seatback subassembly and controlling a secondary linkage;

each of said primary and secondary linkages further comprising an elongate member pivotally mounted at a first lowermost end of said selected first and second seatback subassemblies and being slaved to displace upon rotation of said associated handles; and a second uppermost end of said elongate member pivotally securing to a first lever, in turn rotatably mounted in biased fashion to a selected surface of said selected seatback subassembly;

a main clock spring biasing the seat back in a forward rotating fashion with respect to each of said first and second seatback assemblies, a second clock spring biasing said first lever associated with each of said first and second seatback assemblies in an opposite rotational direction relative to said main clock spring;

a first cable secured to a first location of said primary linkage and extending to said second handle;

a floor latch subassembly mounted to a rearward location of the seat bottom and including at least one cam controlling a pivotally associated latch plate for operatively engaging a first floor supported striker;

a floor supported riser mounted to a further rearward location of the seat bottom and exhibiting an underside configuration adapted to abut a second floor supported striker concurrent with said first latch subassembly engaging the first striker; and a second cable secured to a second location of said primary linkage and extending to said floor latch cam;

either of said first and second handles being manipulated to release the seat back for rotating to a dump position against the seat bottom; either of said handles being further manipulated to facilitate release of said floor latch subassembly from said associated striker and to permit the seat back and seat bottom to pivot about the vehicle floor.

* * * * *

UNITED STATES PATENT AND TRADEMARK OFFICE
CERTIFICATE OF CORRECTION

| | | |
|---|---|---|
| PATENT NO. | : 7,896,420 B2 | Page 1 of 1 |
| APPLICATION NO. | : 12/054734 | |
| DATED | : March 1, 2011 | |
| INVENTOR(S) | : David M. Grable et al. | |

It is certified that error appears in the above-identified patent and that said Letters Patent is hereby corrected as shown below:

IN THE SPECIFICATIONS:
Column 4, line 13 replace "filly" with --fully--

Signed and Sealed this
Twentieth Day of September, 2011

David J. Kappos
*Director of the United States Patent and Trademark Office*